United States Patent [19]
Lopes

[11] Patent Number: 5,389,128
[45] Date of Patent: Feb. 14, 1995

[54] MULTIPLE, SELF-ADJUSTING DOWNHOLE GAS SEPARATOR

[75] Inventor: Divonsir Lopes, Tijuca, Brazil

[73] Assignee: Petroleo Brasileiro S.A. - Petrobras, Rio de Janeiro, Brazil

[21] Appl. No.: 80,106

[22] Filed: Jun. 23, 1993

[30] Foreign Application Priority Data

Jun. 24, 1992 [BR] Brazil ............................. PI9202386

[51] Int. Cl.⁶ ............................................. B01D 19/00
[52] U.S. Cl. ........................................ 96/207; 96/215; 166/105.5; 166/106; 55/218
[58] Field of Search .................... 96/206, 207, 215; 166/105.1, 105.5, 105.6, 106

[56] References Cited

U.S. PATENT DOCUMENTS

| | | | |
|---|---|---|---|
| 2,143,836 | 1/1939 | Anderson | 166/105.1 |
| 2,229,541 | 1/1941 | Zublin | 166/105.5 |
| 2,718,308 | 9/1955 | LeBus | 96/215 X |
| 2,784,677 | 3/1957 | Reichertz et al. | 96/206 X |
| 3,285,186 | 11/1966 | Tracy et al. | 96/215 |
| 3,336,732 | 8/1967 | Carroll | 96/206 |
| 3,357,492 | 12/1967 | Hubby | 166/105.5 |
| 4,088,459 | 5/1978 | Tuzson | 96/207 |
| 4,241,788 | 12/1980 | Brennan | 166/105.5 |
| 4,366,861 | 1/1983 | Milam | 166/105.5 |
| 4,515,608 | 5/1985 | Clegg | 166/105.5 X |
| 4,615,387 | 10/1986 | Johnson et al. | 166/105.5 X |
| 4,676,308 | 6/1987 | Chow et al. | 166/369 |
| 4,919,207 | 4/1990 | Ikuta et al. | 166/267 |
| 5,207,810 | 5/1993 | Sheth | 166/105.5 X |

FOREIGN PATENT DOCUMENTS

| | | | |
|---|---|---|---|
| 981589 | 12/1982 | U.S.S.R. | 166/105.5 |
| 1470939 | 4/1989 | U.S.S.R. | 166/105.5 |
| 1689594 | 11/1991 | U.S.S.R. | 166/105.5 |

Primary Examiner—Robert H. Spitzer
Attorney, Agent, or Firm—Sughrue, Mion, Zinn, Macpeak & Seas

[57] ABSTRACT

A multiple, self-adjusting downhole gas separator includes an external decanting pipe having perforations about the periphery thereof, and a concentric inner suction pipe equipped with inverted L-shaped suction pipe by-passes extending outwardly and downwardly from the periphery of the inner suction pipe. A plurality of respective retention cups are resiliently supported on the inner suction pipe by elastic elements. The retention cups are located in the space between the external decanting pipe and the inner suction pipe and are vertically spaced from each other with a respective L-shaped suction cup by-pass extending into each retention cup. The lower end of the external decanting pipe is closed to define a decanting chamber into which the lower end of the inner suction pipe extends.

10 Claims, 6 Drawing Sheets

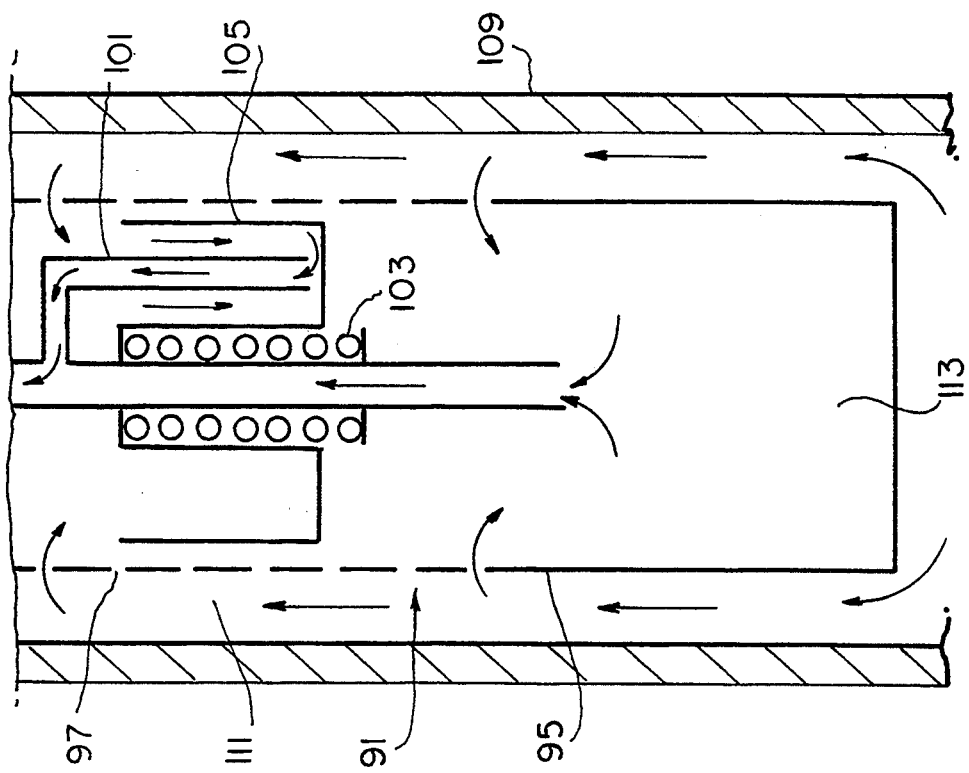
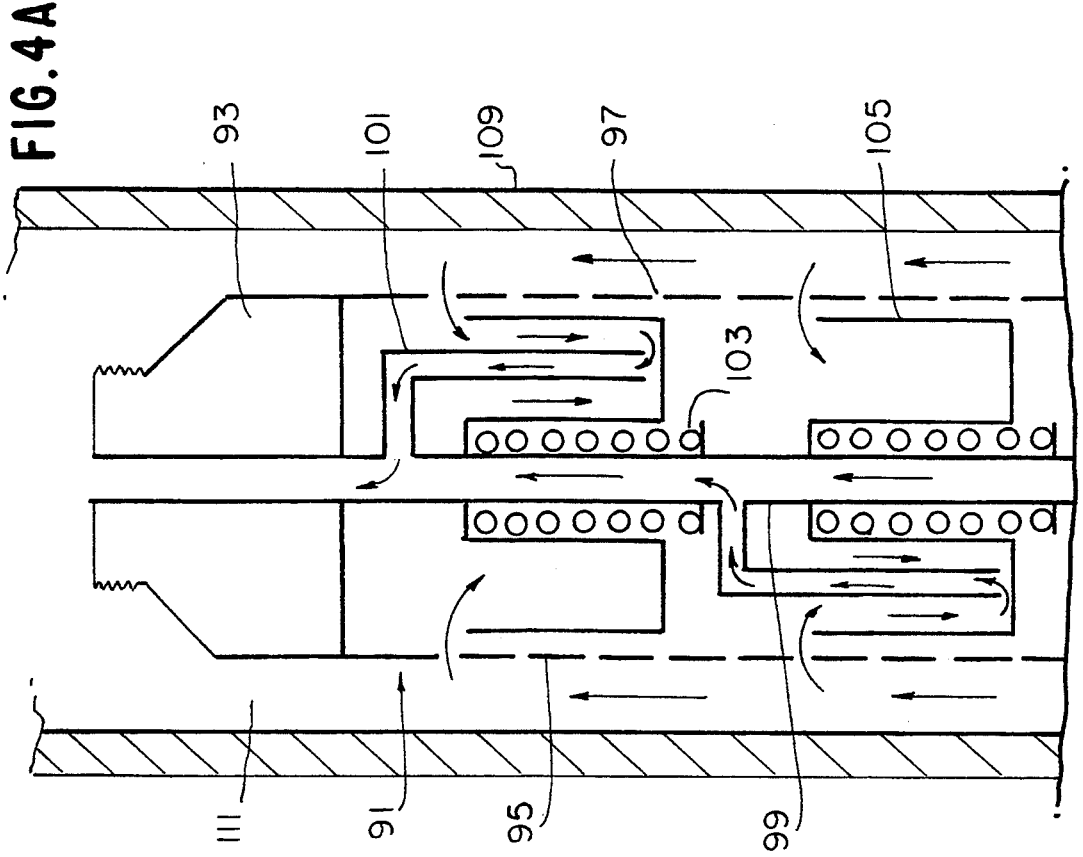

MULTIPLE, SELF-ADJUSTING DOWNHOLE GAS SEPARATOR

FIELD OF THE INVENTION

The present invention concerns a multiple, self-adjusting downhole gas separator, installed in the wellhead production tubing beneath the downhole pump in pumping wells for increased artificial lift efficiency.

PRIOR ART

Further studies in artificial lift are highly recommended. In natural conditions, the liquid products from a producing oil well are recovered from the reservoir by gas lift, using the accumulated energy during rock formation in the form of pressure. In artificial lift, energy is supplied to the system for the benefit of a higher production rate of the oil well as well as to enable hydrocarbon recovery. Artificial lift asks for the installation of special equipment for energy transmission, resulting in higher equipment costs as well as a higher operational cost and an increase in energy consumption. The cost benefit ratio is further harmed by the lower production rate of pumping wells as compared with gas lift wells.

As compared with the known artificial lift methods including mechanical pumping, centrifugal underwater pumping, pumping through progressive cavities, continuous gas lift and intermittent gas lift, the downhole gas separator, also known by specialists as "gas anchor", is for application in pumping methods through series of cavities featuring downhole pumps.

As the efficiency of the downhole pump decreases with the amount of gas passing through it, a downhole gas separator localized before the pump is used to eliminate or at least reduce this amount of gas.

In spite of exhaustive studies with respect to the downhole gas separator, the existing models show a rather low efficiency. It is of great importance for oil prospecting company to increase this efficiency so as to enable the use of artificial lift at wells with a higher gas-liquid ratio.

The main models of downhole gas separator include the conventional downhole separator ("poor-boy"), the cup type downhole separator and the downhole separator type "LE".

The conventional downhole gas separator or "poor-boy" features an external decanting pipe, with a perforated nipple and retention cups at the upper end and a cap at the lower end, and a concentric inner suction pipe, for the rise of the biphasic mixture of gas and liquid through the annular space formed by the production tubing and the separator, with a part of the biphasic mixture flowing into the retention cups and penetrating the external decanting pipe through the perforated nipples, and another part of the biphasic mixture penetrating the lower end of the suction pipe with the liquid phase being directed to the downhole pump.

The downhole gas separator type "LE" features an annular vent, a central deflector, retention cups and a detritus tank at the upper end, for the rise of the biphasic mixture of gas and liquid through the annular space formed by the production tubing and the separator, with a part of the mixture flowing into the retention cups and passing the central deflector causing the liquid phase to be directed to the downhole pump.

The low separation efficiency of the three above-mentioned separator types constitutes a main impairment for its application.

SUMMARY OF THE INVENTION

Aiming at a solution of the above mentioned problems by increasing the separation efficiency of the existing separators, the object of this invention concerns a multiple, self-adjusting downhole gas separator, installed in the wellhead production tubing beneath the downhole pump in pumping wells, to increase the efficiency of artificial lift, composed of a reduction between separator and downhole pump linked to an external decanting pipe, making up the jacket of the separator, featuring circular holes at regular distances at the top and intermediate sections, and a concentric inner suction pipe that penetrates the reduction between separator and pump and clears the bottom of the separator, having a substantially smaller diameter than the external decanting pipe and featuring inverted L type suction pipe by-passes in alternate and consecutive positions on its perimeter as well as adjacent elastic elements in vertical succession for the lateral superposition of retention cups, positioned in the space between the external decanting pipe and the inner suction pipe and in vertical succession so that each suction pipe by-pass is centrally positioned with regard to its respective retention cup.

SHORT DESCRIPTION OF THE DRAWINGS

A detailed description of the invention follows making reference to the drawings that are integral part of this specification:

FIGS. 4A and 4B represent longitudinal section views of the multiple, self-adjusting downhole gas separator that makes up the object of the present invention.

DETAILED DESCRIPTION OF THE INVENTION

Before starting the detailed description of the multiple, self-adjusting downhole gas separator, object of the present invention, reference will be made to FIGS. 1 to 3 of the existing and above mentioned models of downhole gas separators for the purpose of showing clearly the technical differences between these traditional models and the downhole gas separator now being specified.

Figure 1:
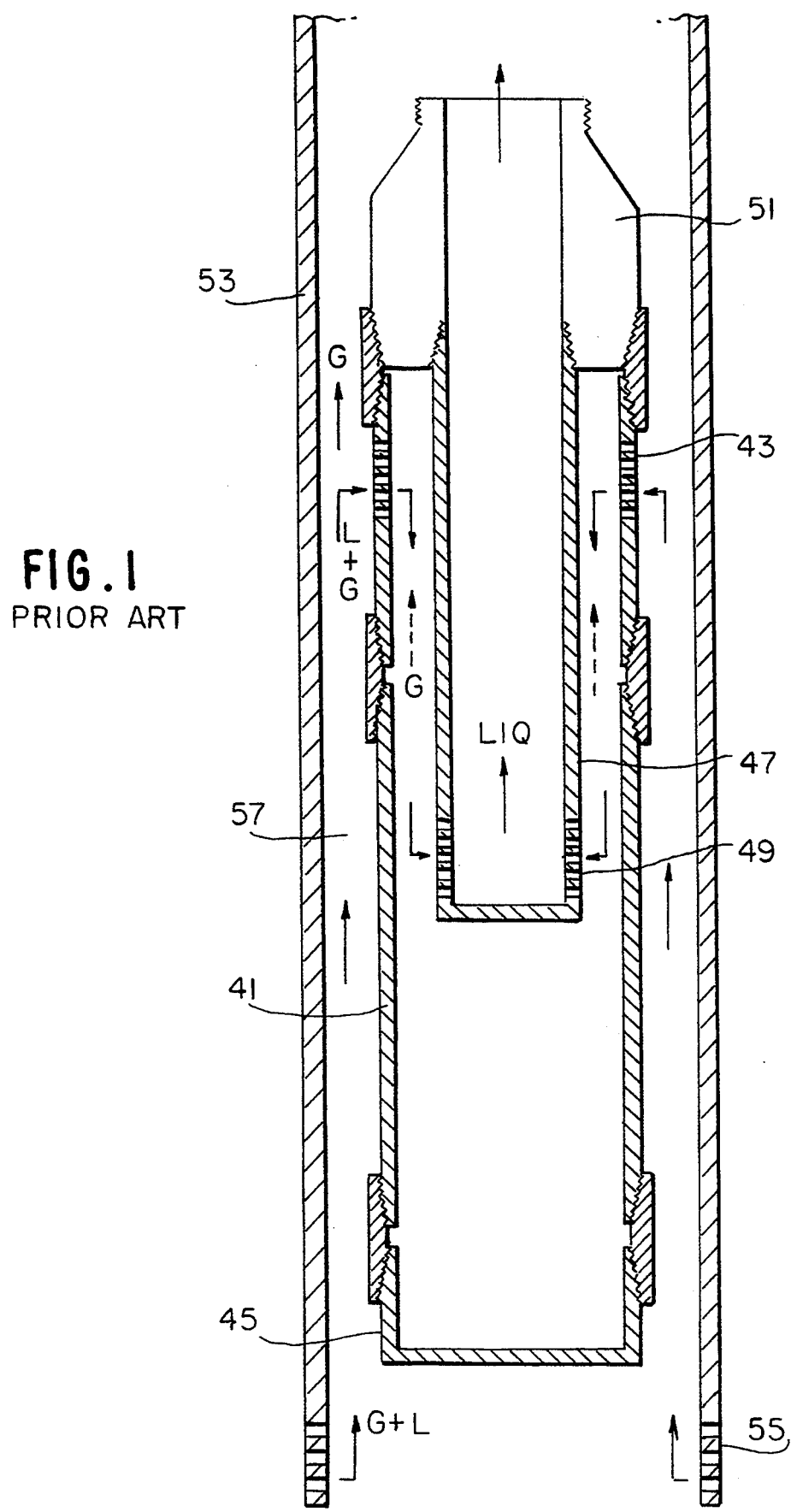
FIG. 1 represents a longitudinal section of a conventional downhole gas separator or "poor-boy", using conventional techniques.

As can be seen from FIG. 1, the conventional downhole gas separator or "poor-boy" is composed of an external decanting pipe 41 featuring a perforated nipple 43 at the upper end and a cap 45 at the lower end, and a concentric inner suction pipe 47 with internal holes 49. FIG. 1 also shows the reduction between separator and downhole pump 51, the production tubing 53 and muzzle cap 55. The biphasic mixture of gas and liquid rises through the annular space 57 with a part of the biphasic mixture entering the external decanting pipe through the perforated nipple 43 and penetrating the inner suction pipe 47 through the series of holes 49 with the subsequent guiding of the liquid phase to the downhole pump.

Figure 2:
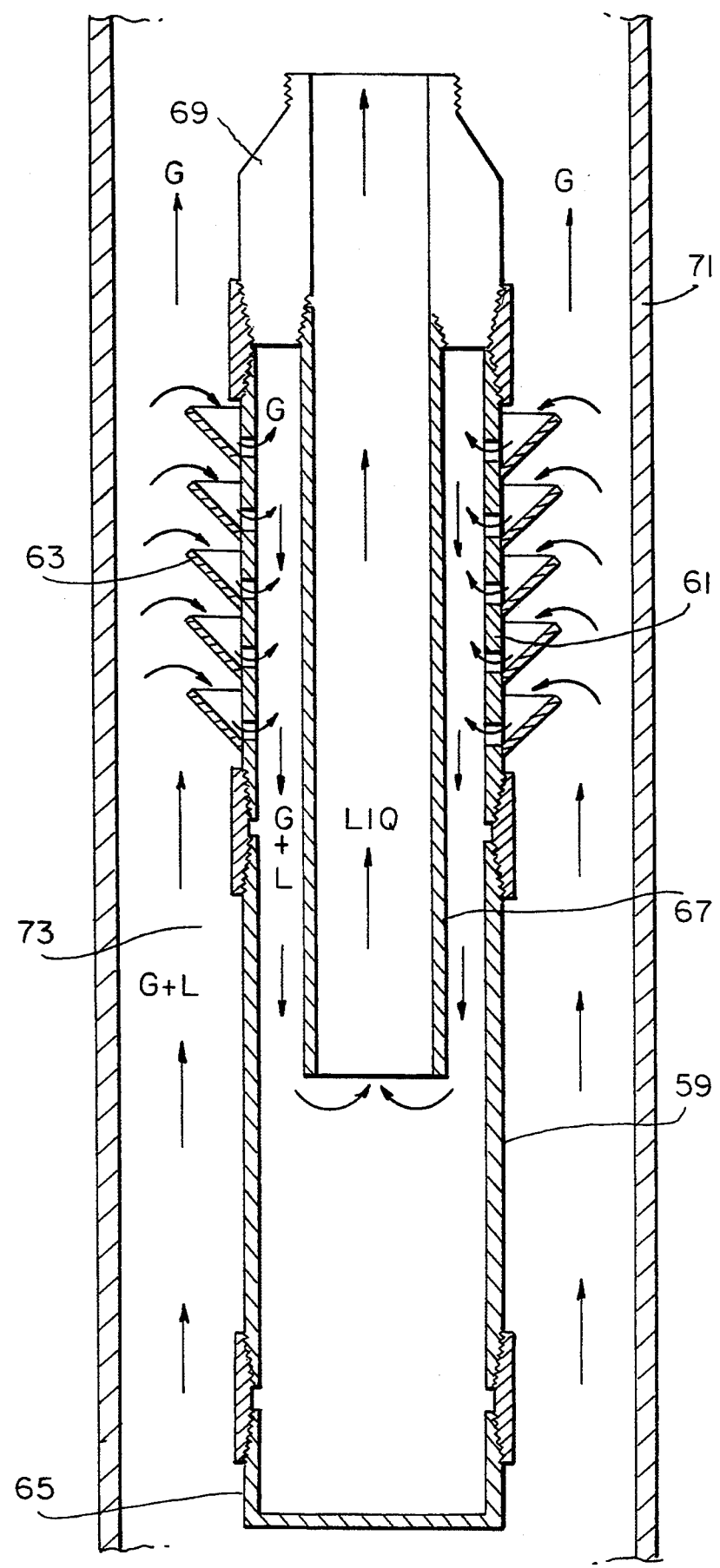
FIG. 2 represents a longitudinal section of a downhole gas separator with cups, using conventional techniques.

As can be seen from FIG. 2, the downhole gas separator with cups is composed of an external decanting pipe 59 featuring a perforated nipple 61 and retention cups 63, at the upper end, and a cap 65 at the lower end, and a concentric inner suction pipe 67. FIG. 2 also shows the reduction between separator and downhole pump 69, and the production tubing 71. The biphasic mixture of gas and liquid rises through the annular space 73 so that part of the biphasic mixture fills the retention cups and penetrates the external decanting pipe 59 through the perforated nipple 61 and part of the biphasic mixture penetrates the lower end of the inner suction pipe 67, with the liquid phase being sent to the downhole pump.

Figure 3:
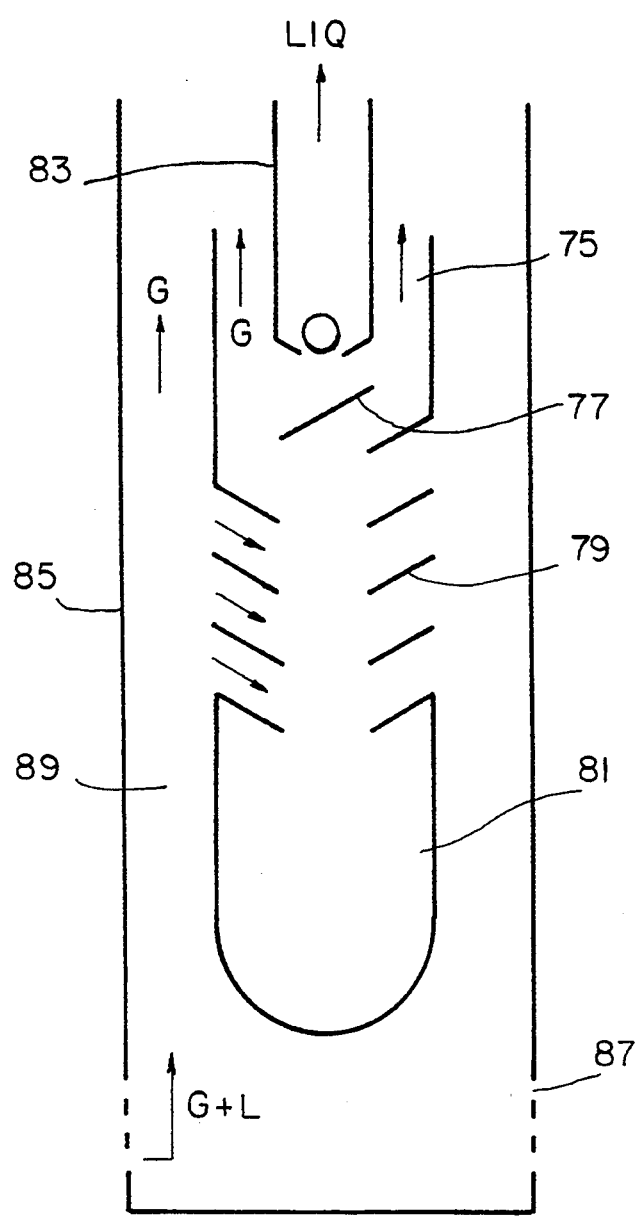
FIG. 3 represents a schematic drawing of the downhole gas separator type "LE", using conventional techniques.
Figure 5:
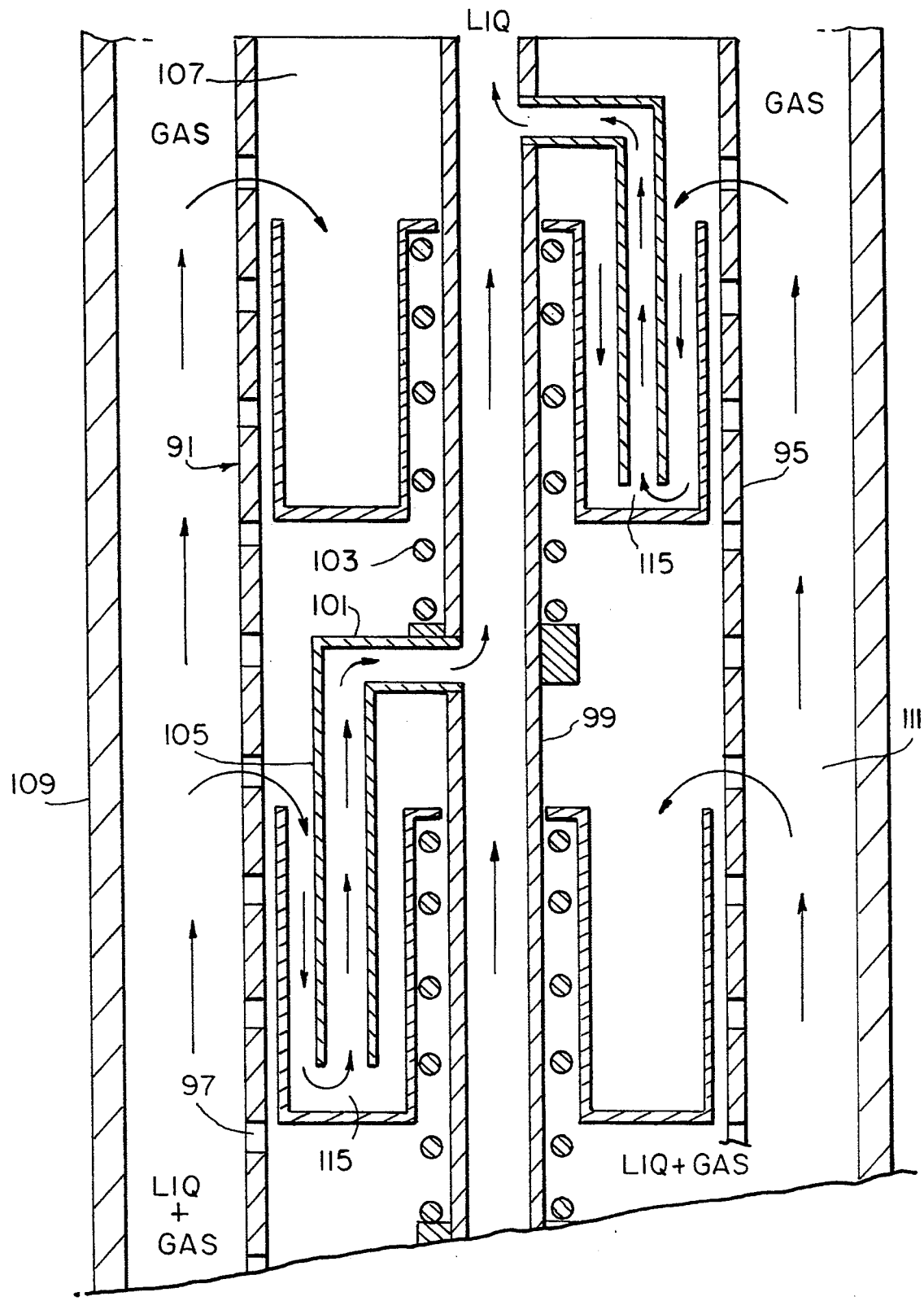
FIG. 5 represents an enlarged view of the upper section of the separator.
Figure 6:
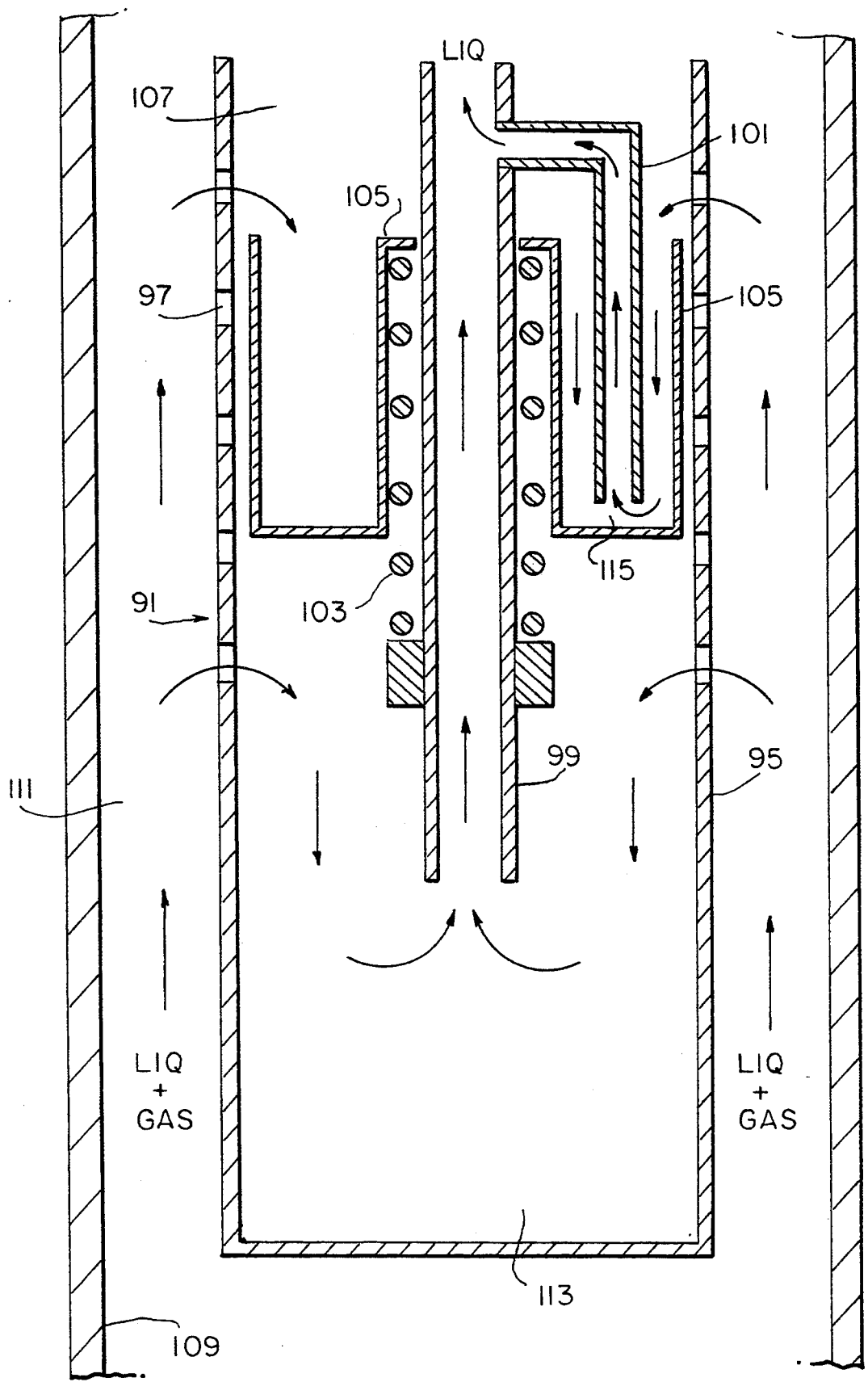
FIG. 6 represents an enlarged view of the lower part of the separator.

As can be seen from FIG. 3, the downhole gas separator type "LE" is composed of an annular vent 75, a central deflector 77, retention cups 79 and a detritus tank 81. FIG. 3 also shows a downhole pump 83, the production tubing 85 and the muzzle plug 87. The biphasic mixture of gas and liquid rises through the annular space 89 so that part of the biphasic mixture fills the retention cups 79 and hits the central deflector 77, with the liquid phase being sent to the downhole pump.

The multiple, self-adjusting downhole gas separator, identified by reference number 91 in drawings 4A, 4B, 5 and 6, is composed of a reduction 93 between the separator and a downhole pump, linked to the external decanting pipe 95, forming the jacket of the separator 91, featuring circular holes 97 at regular distances at the top and intermediate sections, and a concentric inner suction pipe 99 that penetrates the reduction between separator and downhole pump and clears the bottom of the separator 91, having a substantially smaller diameter than the external decanting pipe 95 and featuring inverted L type suction pipe by-passes 101 in alternate and consecutive positions on its perimeter as well as adjacent elastic elements 103 in vertical succession for the lateral superposition of retention cups, positioned in the space 107 between the external decanting pipe 95 and the inner suction pipe 99 and in vertical succession so that each suction pipe by-pass 101 is centrally positioned with regard to its respective retention cup 105.

With the separator 91 installed in the interior of the production tubing 109, the biphasic mixture of gas and liquid rises through the annual space 111 formed by the production tubing 109 and the separator 91, enters the external decanting pipe 95 through the circular holes 97 and fills the retention cups 105. The horizontal component of the liquid flow between the annular space 111 and the retention cup 105 brings about part of the gas-liquid separation, the other part being performed by segregation inside the retention cup 105. The separated gas phase rises through the annular space 111 while the other liquid rises through the inverted L suction by-passes 101 and through the internal suction pipe 99 to gain access to the downhole pump, screwed onto the reduction between the separator and the pump.

The downhole gas separator 91 is considered a multiple device because the separation is performed in parallel—several upper separators with retention cups 105 and a lower separator formed by the lower internal part of the external decanting pipe 95 equipped with holes that act as a decanter 113 and the lower part of the suction pipe 99.

The distribution of the flow between these separators reduces not only the vertical descending velocity of the liquids inside the cups for better segregation, but also reduces the entrance velocity of the liquids emerging from the annular space 111 into the retention cups 105 for better separation due to the horizontal flow component. Thence it follows that the separation efficiency increases with the number of retention cups 105. The downhole gas separator 91 is considered self-adjusting to the operational conditions because of the existence of elastic elements 103, such as springs, for the lateral support of the retention cups 105. The gradual filling of a retention cup 105 with liquid causes an increase in its weight and the compression of the spring, lowering the cup and opening the passage 115 or mechanical blockage of the gas entrance to the pump existing between the bottom of the cup and the opening of the suction pipe by-pass 101. The self-adjusting feature, or level control in each retention cup, is necessary for two reasons: the first one is related to the lack in homogeneity of the biphasic flow so that different retention cups 105 receive unequal flow quantities and the second and most important reason refers to the parallel mode operation of the separator 91.

Conventional separators also feature multiple entrances implemented through multiple retention cups (downhole gas separators with cups or type "LE") or through multiple openings in the external decanting pipe (conventional downhole gas separator or "poor-boy"), but these multiple entrances are not enough to assure the multiple operation of the separators.

At these entrance points, the liquids should concentrate at the internal part of the separator and the gas phase at the external part (annular space). If these would really happen, two parallel vertical and interlinked flows (through cups or multiple openings) with distinct densities would be formed along the external decanting pipe. Under these conditions, the flow would turn unstable and its stability would only be restored through the equalization of average density as a result of migration currents from the interior of the separator to the annular space and vice-versa.

Thence it follows that the separation at the multiple entrances in conventional separators only occurs at the lower entrances with a resulting decrease in efficiency. The volumetric fractions of gas at the interior and exterior of the upper entrances remain close so as to maintain a stable biphasic flow.

The downhole gas separator type "LE" shows a higher efficiency when some of its cups are closed during experiments. The increases in number of open cups probably amount to a higher level of flow instability, as mentioned above, with a decrease in separation efficiency due to turbulence, the separation only being performed by the lower cup.

The downhole gas separator 91, the object of this invention, operates in multiple mode with the lower part of the internal suction pipe 99 as the only free passage, or mechanical blockage, between that part and the annular space 111. This link tends to equalize the pressures in the internal suction pipe 99 and the annular space 111 at the lower opening 97 in the external decanting pipe 95. Dependent upon the quantity of separated gas, the pressure in the annular space could be above that in the internal suction pipe 99 at the level of the retention cups 105. Under these conditions, no gas will flow into the retention cups 105 transforming them into gas seals while allowing the mechanical blockage through liquid accumulation only. Thence it follows that the self-adjusting feature promotes the multiple operational mode of the separator 91.

The filling of one or more retention cups 105 causes the transfer of liquid from the upper cups to the lower ones, and mainly to the decanter 113. This flow is caused by siphon effect and its intensity is a function of the height and the average density difference between the liquid columns in the internal suction pipe 99 and the annular space 111, a direct function as such of the quantity of gas in the annular space 111. In this manner, the retention cups 105 and the decanter 113 discharge liquid directly to the downhole pump or to other retention cups 105 and the decanter 113, enabling the liquid to return to the original retention cup 105 or decanter 113.

The multiple, self-adjusting downhole gas separator, the object of the present invention, has hereby been described with reference to its most desirable application. Clearly, modifications will occur due to the reading and comprehension of this specification. Modifications that fall in with the scope of the enclosed claims or its equivalents will be enacted.

I claim:

1. A multiple, self-adjusting downhole gas separator for installation in wellhead production tubing beneath a downhole pump in pumping wells to increase the efficiency of artificial lift, said separator comprising an external decanting pipe having perforations in top and intermediate sections thereof and a concentric inner suction pipe having inverted L-shaped suction pipe by-passes extending outwardly from a peripheral wall thereof, a plurality of respective retention cups disposed adjacent each suction pipe by-pass and positioned between the external decanting pipe and the inner suction pipe in vertical succession so that each suction pipe by-pass is centrally positioned with regard to a respective retention cup and elastic elements on said inner suction pipe supporting said retention cups in position adjacent each suction pipe by-pass.

2. A downhole gas separator according to claim 1 wherein said perforations have a circular section and are spaced at a regular distance between each other.

3. A downhole gas separator according to claim 1 wherein said/internal suction pipe penetrates a reduction at an upper end of said separator and is spaced from a bottom end of said separator.

4. A downhole gas separator according to claim 1 wherein said internal suction pipe has a diameter substantially smaller than a diameter of said external decanting pipe.

5. A downhole gas separator according to claim 1 wherein a lower section of said external decanting pipe forms a decanter.

6. A downhole gas separator according to claim 1 wherein said suction pipe by-passes are centrally positioned with respect to each respective retention cup.

7. A downhole gas separator according to claim 1 wherein said elastic elements are comprised of springs.

8. A downhole gas separator according to claim 1 wherein said retention cups are laterally supported by said elastic elements.

9. A downhole gas separator according to claim 8 wherein upon gradual filling of each retention cup said elastic element associated therewith will be compressed by weight to open a passage formed by a bottom wall of said retention cup and an opening in a lower end of said suction pipe by-pass.

10. A downhole gas separator according to claim 1, wherein upper separators comprised of said retention cups and a lower separator formed by said lower section of said external decanting pipe and a lower end of said internal suction pipe operate in a parallel mode.

* * * * *